United States Patent [19]

Martin

[11] 4,091,647
[45] May 30, 1978

[54] MACHINE FOR CHISEL FORMING THE TEETH ON PARTS OF REVOLUTION, AND IN PARTICULAR WHEELS OF CIGARETTE LIGHTERS OR THE LIKE

[76] Inventor: Michel Martin, 44, Av. Jacques Arnaud, Cluses, France, F-74300

[21] Appl. No.: 779,029

[22] Filed: Mar. 18, 1977

[30] Foreign Application Priority Data

Mar. 22, 1976  France ............................ 76 08276

[51] Int. Cl.² ............................................. B21D 31/02
[52] U.S. Cl. .......................................... 72/72; 72/325; 72/703
[58] Field of Search ................. 72/71, 72, 325, 703; 76/16, 28

[56] References Cited

U.S. PATENT DOCUMENTS

| 190,142 | 5/1877 | House | 76/28 |
|---|---|---|---|
| 1,133,800 | 3/1915 | Hess | 76/16 |

*Primary Examiner*—Lowell A. Larson
*Attorney, Agent, or Firm*—Larson, Taylor and Hinds

[57] ABSTRACT

Disclosed is a machine for chisel forming the teeth on parts of revolution, and in particular wheels of cigarette lighters or the like, comprising a programmer whose drum is rotated permanently by a first linkage engaged with the drive shaft of the machine, a spindle receiving and rotating the workpiece to be toothed, means for holding this workpiece during the forming of its teeth, a device for storing and presenting the workpieces, a system for imparting rotation to the spindle and a chisel-holder striking device comprising a chisel fixed on a back-and-forth moving device keeping the chisel engaged with the driving means which require it, upon the striking of each tooth, to describe an imposed path causing it to penetrate forcefully, under pressure, into the workpiece to form the hollow of the tooth by working up the material.

9 Claims, 6 Drawing Figures

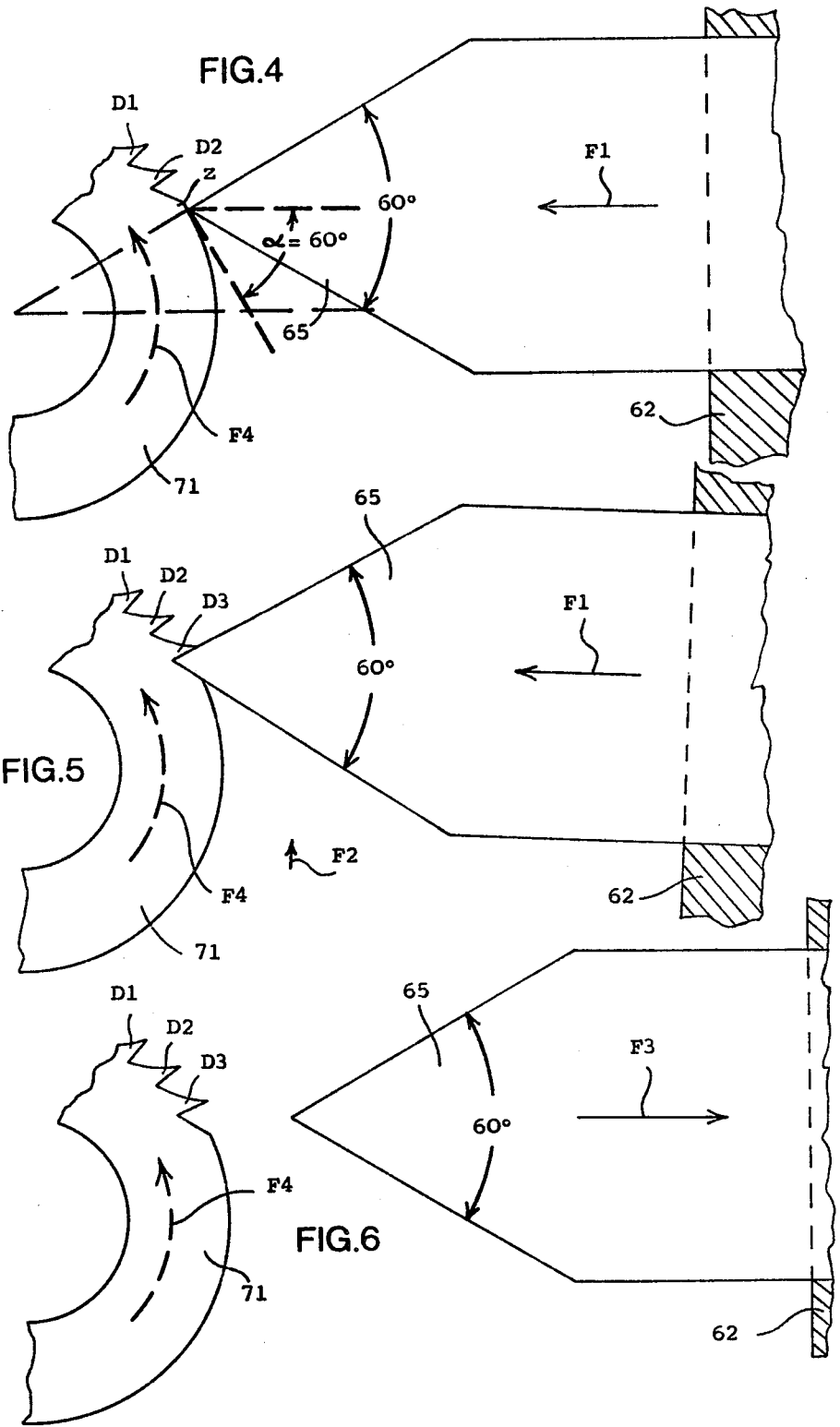

MACHINE FOR CHISEL FORMING THE TEETH ON PARTS OF REVOLUTION, AND IN PARTICULAR WHEELS OF CIGARETTE LIGHTERS OR THE LIKE

FIELD OF THE INVENTION

The present invention relates to a machine for making chisel impressions, and intended for the forming of small mechanical parts of revolution and more particularly for the forming of teeth in wheels of cigarette lighters or similar devices (stove lighter, etc.).

BACKGROUND OF THE INVENTION

It is known that these wheels have cutting teeth which, when rubbed on a flint, produce a spark for lighting. These teeth must be made with sufficient precision and regularity so that the operation of the wheel is satisfactory. Presently-known processes for the making of such teeth are: milling by generation, milling tooth by tooth, rolling by the "Rotor-Flow" process and chisel striking.

Milling by generation and milling tooth by tooth require the use of costly machines and tools (special cutters). In addition, the life of these tools is short especially when frequent sharpening is called for, and sharpening is necessarily frequent in this case because, to ensure proper quality, these lighter wheels must be made of hard alloy steels.

Milling by the "Roto-Flow" process does not always make it possible to obtain the desired geometrical form of the teeth, especially when the toothing has a re-entrant angle.

Chisel striking is the most suitable method provided that use is made of a machine fulfilling certain imperative requirements: rigidity, reliability and accuracy of its mechanism, which alone make it possible to ensure the rapid execution of the teeth, the desired precision of the teeth, the exactitude of tooth form, the uniformity and regularity of toothing in mass production runs, the possibility of varying the diameter and the number of teeth on the wheel, the facility of the required adjustments, the possibility of using standard, commercially-available chisels for striking, the speed with which these chisels are refitted after sharpening, automatic operation of the machine or operation with a stop after each cycle.

Existing machines do not always fulfil these conditions. In those which employ chisel striking, this striking is obtained by flying impact and then rebounding of the chisel which then works only under inertia, in the manner of a hammer. If the required mechanism is simplified, in particular owing to the fact that it is then not necessary to slow down the workpiece during the striking which takes place "on the fly," the accuracy of the impact and, consequently, the regularity of the teeth obtained remain uncertain.

SUMMARY OF THE INVENTION

In the machine according to the invention which, on the contrary, fulfils the above-mentioned conditions, the chisel works with force, i.e. penetrates under pressure into the workpiece to form the hollow of a tooth and remains constantly engaged with its driving means which make it describe an imposed path which is repeated with the striking of each tooth. The result is the obligation of at least slowing down or, preferably, stopping the workpiece during the penetration of the chisel, while conserving a high striking rhythm, thereby allowing a mechanical arrangement specific to the machine and constituting one of its essential characteristics.

This machine comprises at least a programmer whose drum is rotated permanently by a first linkage engaged with the drive shaft of the machine, a spindle receiving and rotating the workpiece to be toothed, means for holding this workpiece during the forming of its teeth, a device for storing and presenting the workpieces, a system for imparting rotation to the spindle and a chisel-holder striking device.

It is characterized by the fact that the chisel-holder striking device comprises a chisel fixed on a back-and-forth moving assembly, keeping the chisel engaged with the driving means which require it, upon the striking of each tooth, to describe an imposed path causing it to penetrate forcefully, under pressure, into the workpiece to form the hollow of the tooth.

According to another characteristic of the invention, the spindle rotation system is constituted by a second linkage independent of the one driving the drum of the programmer, comprising a drive shaft engaged with the drive wheel of this spindle through a reduction gearing transmission, a wormwheel carried by this drive shaft, a drive element whose central part consists of a worm meshing with said wormwheel, one end of which carries a camgroove with guide ramps in which is introduced a fixed control roller, and the other end of which, forming a coupling, remains in angular engagement with the driving device of a driving shaft which is kept engaged throughout the forming of the teeth with the drive shaft of the machine.

According to another important characteristic of the invention, said moving assembly being constituted by a chisel-holder head, said means driving the latter comprise, on the one hand, an oscillating lever hinged at its middle part on a pin integral with an upright of the frame of the machine and at the lower part of which is fixed this head and, on the other hand, a connecting rod of which one end is hinged on a pin of the base of this oscillating lever and the other end receives an eccentric carried by the driving shaft.

A further characteristic of the invention consists in the fact that the chisel-holder head is made up, on the one hand, of a clevis fixed on the upper part of said oscillating lever and, on the other hand, of a body in which the chisel is fixed and which is hinged on a pin of this clevis, an angular rocking of small amplitude being tolerated between this body and this clevis, under compression by a high-stiffness spring fixed on said clevis.

Other characteristics and advantages of the invention will better appear from the following description and the appended drawing with reference to a preferred embodiment of the machine of the invention, given by way of non-limitative example.

BRIEF DESCRIPTION OF THE DRAWINGS

FIGS. 4, 5 and 6 show, in an enlarged manner, the three successive phases for striking a tooth by the machine according to this preferred embodiment.

DETAILED DESCRIPTION OF THE PREFERRED EMBODIMENTS

Figure 1:
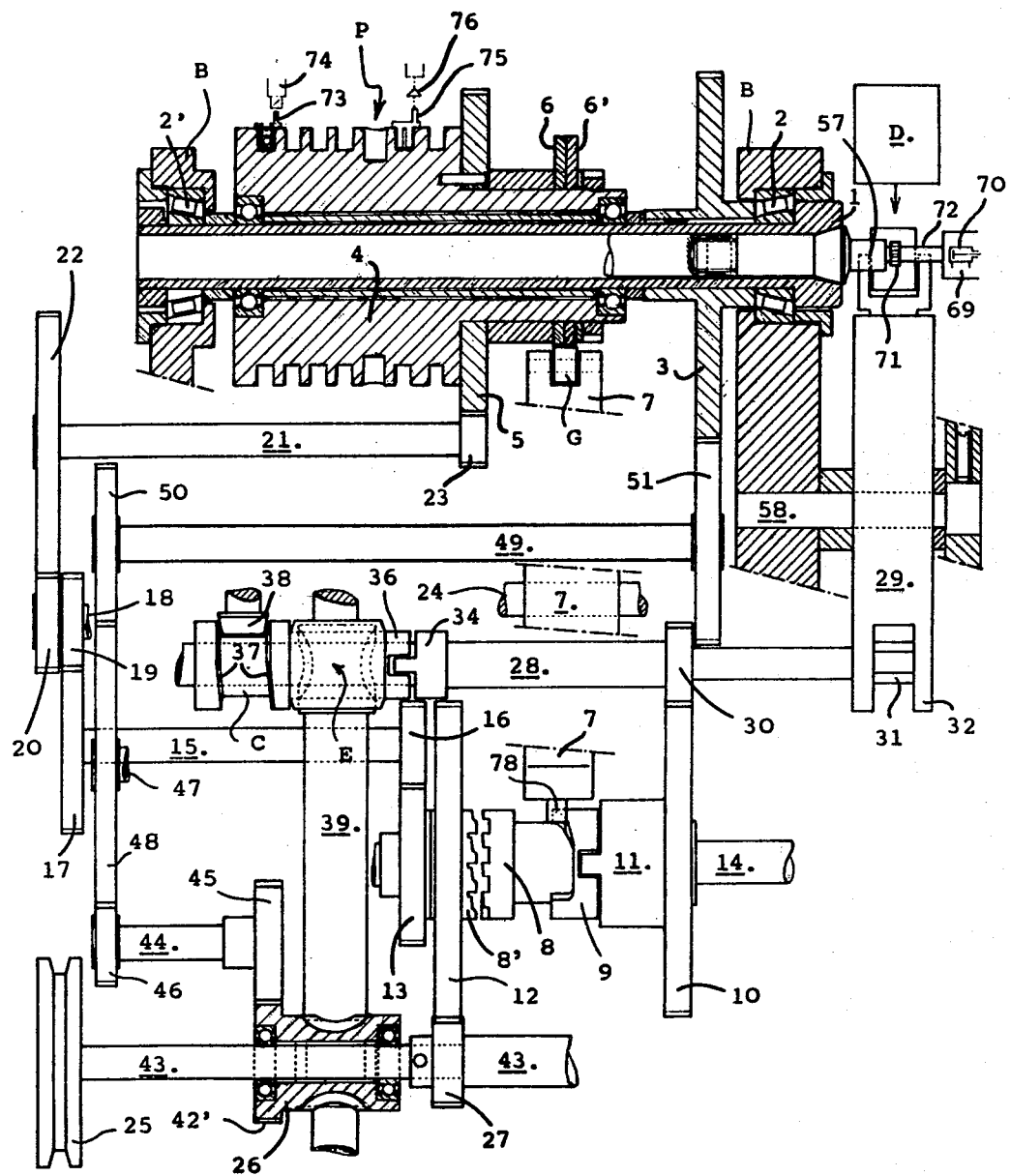
FIG. 1 is a general diagram of the mechanism of this machine.

Referring first of all to FIG. 1, this machine comprises, firstly, mounted coaxially but independently: a spindle 1 receiving and rotating the workpiece to be toothed 71, swivelling on two taper roller bearings with play-takeup 2 and 2', in the frame B of the machine, and a drum 4 of the programmer P provided on the outside with four fingers, such as 73, acting on electrical controls 74, and two fingers, such as 75, acting on pneumatic valves 76, electrical controls and pneumatic valves which trigger, according to the programme assigned to the machine, the different machine elements. The drum 4 is moreover provided with a cam with adjustable sectors 6 and 6' the role of which will appear further below, as well as with a driving wheel 5. A driving wheel 3, integral with the spindle 1, allows the intermittent rotation of the spindle, as will appear from the description of the operation of the machine.

A distributor D makes it possible to store and present the workpieces, while means for holding each workpiece 71 throughout the formation of the teeth are provided in the form, firstly, of a workholder mandrel 57 carried by the spindle 1 and on which is placed the workpiece 71 and, secondly, by a mandrel 72 free to rotate and applying the workpiece 71 forcefully under pressure against the mandrel 57 thanks to a centre 69 driven by a double-acting staged pneumatic cylinder 70.

A pulley 25 rotated permanently by the motor, not shown, of the machine keeps the drive shaft 43 of this machine rotating. A pinion 27 fixed on this drive shaft 43 meshes with a drive wheel 12 having a dog clutch 8'. The drum 4 is kept constantly engaged with the drive shaft 43 by means of a first linkage comprising a toothed wheel 13, coaxial and integral with the wheel 12 meshing on a pinion 16 integral with a first intermediate shaft 15 driving a transmission pinion 17 which meshes on a reception pinion 19 connected solidly, by a second intermediate shaft 18, to a transmission pinion 20 which meshes on a receiving wheel 22 rotating the control shaft 21 of the programmer whose pinion 23 meshes on the drive wheel 5 integral with the drum 4 of this programmer P.

Figure 2:
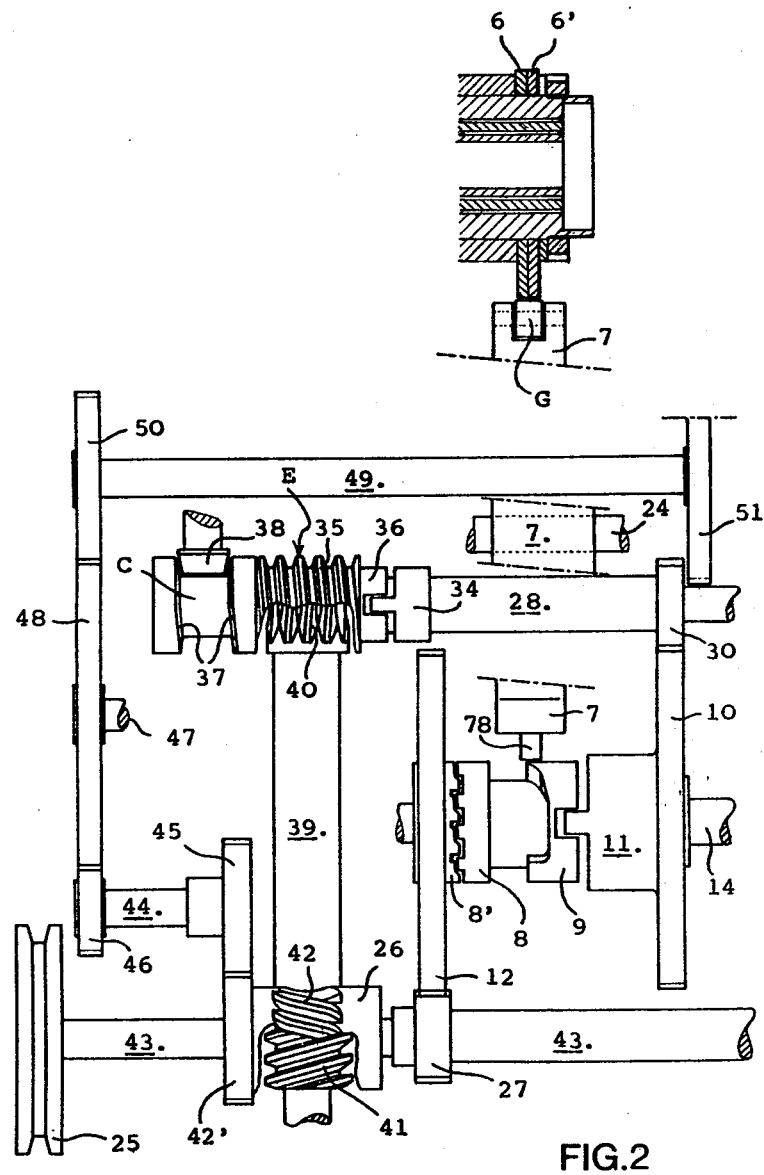
FIG. 2 reproduces in detail the second linkage intended for the intermittent driving of the spindle.
Figure 3:
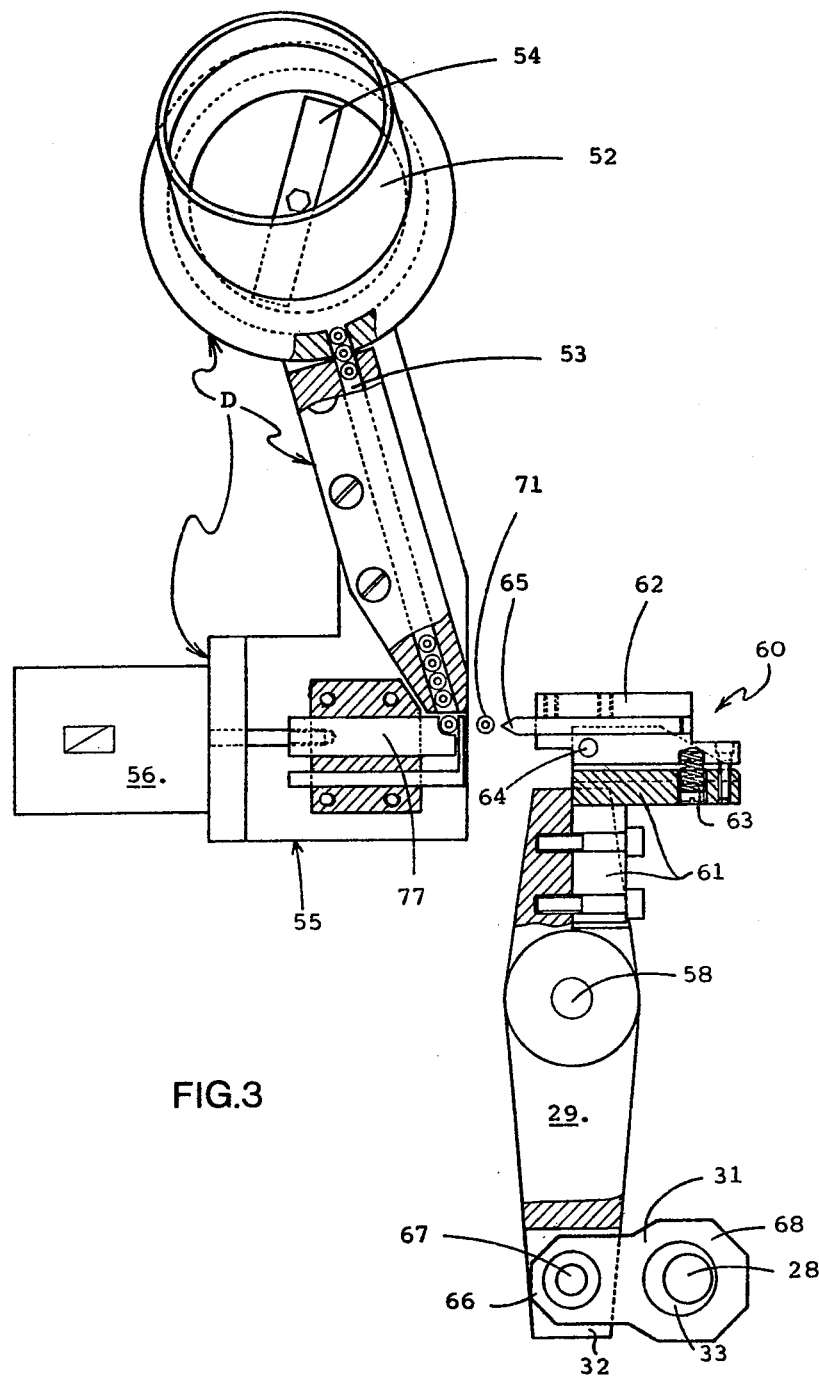
FIG. 3 shows, according to a plane perpendicular to that of FIG. 1, both the device for storing and presenting the workpieces and the chisel-holder striking device.

Referring now to FIGS. 1 and 2, the system imparting intermittent rotation to the spindle 1 is composed of a second linkage, independent of the first linkage just described and comprising, firstly, a reduction-gear transmission consisting of a wormwheel 26 mounted floatingly on the drive shaft 43 whose pinion 42' meshes on a reception pinion 45 driving a first intermediate shaft 44 whose transmission 46 meshes in turn with a transmission pinion 48 carried by a second intermediate shaft 47 and which meshes on a reception pinion 50 imparting rotation to the drive shaft 49 carrying a drive pinion 51 which meshes on the drive wheel 3 of this spindle 1; secondly, a drive shaft 39 carrying at one end a worm 41 meshing with the threads 42 of the wormwheel 26 and the other end of which carries another wormwheel 40 meshing with the worm 35 constituting the central part of a driving element E of which one end carries a cam-groove C with guide ramps 37 in which is introduced a fixed control roller 38 and whose other end, forming a coupling 36, remains in angular engagement with the driving device 34 carried by one of the ends of a driving shaft 28 provided with a driving pinion 30 and whose other end is provided with an eccentric 33 (FIG. 3). The drive pinion 30 meshes on a transmission wheel 10 carried by a central shaft 14 and integral with a sleeve with driving device 11 in angular engagement with a coupling 9 carrying a dog clutch 8 arranged opposite the dog clutch 8' with which it cooperates.

A lever 7 for locking and unlocking the dog clutches 8 and 8' is hinged on a pin 24 integral with the frame of the machine. One of its two ends is provided with a rotating roller G actuated by the cam with adjustable sectors 6, 6', integral with the drum 4, while its other end carries a tenon 78 capable of retaining axially the coupling 9, as will appear further below.

Referring now to FIGS. 1 and 3, the chisel-holder striking device comprises a chisel-holder head 60, an oscillating lever 29 hinged in its middle part on a pin 58 integral with an upright 59 of the frame B of the machine, and a connecting rod 31 driving alternately this oscillating lever 29. The chisel-holder head 60 is made up, firstly, of a clevis 61 fixed on the upper part of the oscillating lever 29 and, secondly, of a body 62 in which is fixed the chisel 65 and which is hinged on a pin 64 of this clevis 61. An angular rocking of small amplitude is tolerated between this body 62 and said clevis 61, under the compression of a highstiffness spring 63 placed between these two parts 62 and 61 and fixed to the clevis 61. The role of this spring will appear further below.

One of the ends 66 of the connecting rod 31 is hinged on a pin 67 carried by the base, in a fork 32, of the lever 29 and, its other end 68 receives the eccentric 33 carried by the driving shaft 28.

The distributor D properly so-called (FIG. 3) comprises, firstly, a bowl 52 receiving the workpieces, driven in alignment in a feed channel 53 by the rotation of a propeller 54 driven from the shaft 49 and receiving said workpieces by gravity owing to the inclination of the wall of the bowl 52. This distributor also comprises a loader 55 whose loading strip 77 is controlled by the energizing of the coil of an electromagnet 56.

The machine operates in the following manner:

The drum 4 of the programmer P is rotated permanently by the first linkage. Each of its revolutions corresponds to a work cycle during which are successively carried out the following operations: striking of the teeth, in this case forty teeth for a cigarette lighter wheel, constituting the complete toothing of the workpiece 71, then releasing this workpiece 71 which when completed falls by gravity, and finally the feeding and positioning of a new workpiece.

Throughout the formation of this toothing of the workpiece 71, and under the action of the cam with adjustable sectors 6, 6', the lever 7 is kept in such a position that its tenon 78 remains disengaged from the coupling 9 which, under the effect of return means, not shown, connects the dog clutches 8 and 8' thereby holding the driving shaft 28 engaged with the drive shaft 43. After the formation of a tooth D2 (FIG. 4), this driving shaft 28, on the one hand, by the rotation of the eccentric 33 causes the backward inclination of the lever 29, moves the chisel 65 away from the workpiece 71 (arrow F3/FIG. 6) and, on the other hand, by the driving device 34 engaged with the coupling 36 of the driving element E produces the rotation of the latter which, as long as the fixed roller 38 has not yet engaged the ramps 37 of the camgroove C, transmits entirely the movement of this driving shaft 28 to the shaft 39 and, through the second linkage and the reductiongear transmission, to the driving wheel 3 of the spindle 1 which, in rotation, makes the workpiece 71 go in the direction of arrow FA (FIGS. 4 to 6) from the position in which this tooth D2 is struck to the position in which the following tooth D3 is struck.

The fixed roller 38 then engaging in the ramps 37 of the cam-groove C causes an axial shifting (toward the left in FIGS. 1 and 2) of the driving element E which, according to the profile given to its ramps 37, has the effect of partially or totally compensating the effect of the rotation of the worm 35 on the wormwheel 40 and, consequently, of reducing or cancelling the transmission by this worm 35 to the wormwheel 40 and to the spindle 1 of the rotation movement of the driving shaft 28 and, consequently, of slowing down or cancelling for a certain period of time the rotation movement of the workpiece 71. At the same time, the rotation of the eccentric 33 causes the tripping of the lever 29 in the other direction and the approach and then the forceful penetration of the chisel 65 into the workpiece 71 (FIG. 5) to form another tooth D3, followed by the retraction of the chisel 65 in the direction of the arrow F3. The fixed roller 38 then disengages from the ramps 37 and causes a reverse shifting of the driving element E which is then brought back to its initial position, thereby resulting in a take-up effect producing a temporary acceleration of the rotation of the shaft 39 of the second linkage and of the spindle 1 under the combined effect of the constant rotation of the worm 35 and its withdrawal to the initial position.

Thus, the chisel 65 penetrates forcefully for the formation of the successive tooth grooves with the workpiece 71 rotating very slowly and even, and preferably, standing still.

Referring now to FIGS. 4, 5 and 6, it is seen that, in the considered example, the angle of the faces of the tip of the chisel 65 is sixty degrees and that this chisel 65 meets the workpiece 71 in a dissymmetrical manner (FIG. 4) according to an angle $\alpha$ smaller than 90° and, in the considered example, equal to sixty degrees. Owing to the unequal distribution of the material of the workpiece 71 on either side of the faces of the tip of the chisel 65, this chisel, progressing in the direction of the arrow F1, is loaded in the direction of the arrow F2 (FIG. 5) with a slight deviation, thereby working up the zone of material "z" (FIG. 4) which forms the tooth D3 (FIG. 5).

The chisel 65 can take this loading without stress, by tilting slightly against and compressing the high-stiffness spring 63. This arrangement considerably reduces the risk of breakage and wear in the chisel so that its sharpening is required more rarely and its service life is longer.

The relaxation of the spring 63 upon the withdrawal of the chisel (FIG. 6) brings the latter back to its initial position in relation to the clevis 61. Thus, the teeth D1, D2 and D3 can be formed in a perfectly regular manner despite the high striking rhythm of the chisel. The reentrant angle of the grooves of the teeth is particularly suitable for the formation of the teeth on cigarette lighter wheels which are the workpieces 71 in the considered example.

After each cycle, the programmer P withdraws the mandrel 72 thereby causing the dropping of the completed workpiece 71, the actuation of the means for the positioning of another workpiece and, by the repositioning of this mandrel 72, the holding of this new workpiece ready for the formation of its teeth.

Finally, since the preferred embodiment of the machine according to the invention as described and represented in the drawing is given only by way of non-limitative example, those skilled in the art will be able to make any modifications in form or detail considered useful or replace all or part of the constituent elements by equivalent ones, without departing from the scope of the invention.

I claim:

1. A machine for chisel forming teeth on the periphery of workpieces such as rotatable parts of the type, for example, of wheels for cigarette lighters and the like, said machine comprising:

a frame having a rotatable main drive shaft mounted thereon;

a machine programmer which includes a rotatable drum;

a first linkage coupled to said main drive shaft and driven thereby for continuously rotating said drum;

means for storing and delivering the workpieces;

a spindle being for receiving and rotating the workpiece and including means for releasably holding the workpiece during the formation of teeth therein;

means for cutting the teeth in the workpiece comprising a holding means for holding a chisel, and means driven by said drive shaft for reciprocatingly moving said chisel holding means, said chisel being held and driven such that upon the striking of each tooth, said chisel describes an imposed, driven path which results in the chisel forcefully penetrating, under pressure, into the workpiece, and in the formation of the hollow of the tooth by the working up of the material of the workpiece; and means for rotating said spindle and the workpiece held therein for a first time period necessary to rotate the workpiece from one to the next position for striking, then for a second time period for at least reducing the speed of rotation of said spindle and hence of the workpiece, during which the tooth is struck, then for a third time period for accelerating the speed of rotation of said spindle to compensate for the amount of rotation lost during said second time period, and then repeating said steps until all of the teeth have been cut, said spindle rotating means including a second linkage coupled to said main drive shaft and driven thereby independently of said first linkage.

2. A machine as claimed in claim 1 wherein said spindle rotating means comprises a shaft onto which said spindle is mounted and a first drive wheel rigid with said shaft; and wherein said second linkage comprises a reduction gearing transmission coupled to said first drive wheel, a second linkage drive shaft rotatably mounted, a wormwheel carried by said second linkage drive shaft, a drive element having a worm which meshes with said wormwheel and which is mounted on a worm shaft, a cam-groove having guide ramps located on said wormshaft on one side of said worm, a fixed control roller located in said cam-groove and periodically engaging said guide ramps, and a coupling mounted on the other side of said worm on said wormshaft, and a driving shaft attached to said coupling for the rotation thereof and coupled in turn to be rotated by said main drive, whereby during said first time period said driving shaft rotates said spindle through said aforesaid second linkage elements; during said second time period, said drive element is axially shifted as said driving element is rotated as a result of said control roller engaging said ramps and thereby resulting in at least the reduction of the rotational drive by said worm to said wormwheel and through said reduction gear to said spindle, the profile of said ramps determining the amount of speed reduction; and during said third time period the makeup-acceleration of said spindle resulting from the reverse-shifting of said drive element back toward the initial position thereof during the disengagement of said control roller from said ramps of said cam-groove.

3. A machine as claimed in claim 2 wherein
said chisel holding means comprises a chisel-holder head; and
wherein said reciprocating moving means comprises
 an oscillating lever being for mounting at the upper portion thereof said chisel-holder head,
 a mounting pin rigidly mounted on said frame being for pivotably mouting said oscillating lever at the middle portion thereof,
 a driving shaft coupled to and rotated by said main driving shaft,
 an eccentric means mounted on said driving shaft,
 a connecting rod pivotably connected at one end thereof to the base portion of said oscillating lever and the other end thereof connected to said eccentric means,
 such that the rotation of said driving shaft simultaneously actuates said second linkage with the resultant intermittent rotation of workpiece and through said eccentric means oscillates said oscillating lever with the resultant reciprocating movement of a chisel in said chisel holding means.

4. A machine as claimed in claim 1 wherein
said chisel holding means comprises a chisel-holder head; and
wherein said reciprocating moving means comprises
 an oscillating lever being for mounting at the upper portion thereof said chisel-holder head,
 a mounting pin rigidly mounted on said frame being for pivotably mounting said oscillating lever at the middle portion thereof,
 a driving shaft coupled to and rotated by said main drive shaft,
 an eccentric means mounted on said driving shaft,
 a connecting rod pivotably connected at one end thereof to the base portion of said oscillating lever and the other end thereof connected to said eccentric means,
 such that the rotation of said driving shaft simultaneously actuates said second linkage with the resultant intermittent rotation of workpiece and through said eccentric means oscillates said oscillating lever with the resultant reciprocating movement of a chisel in said chisel holding means.

5. A machine as claimed in claim 1 and further including a driving shaft; and
 a clutch system coupling said driving shaft to said main drive shaft and comprising
 a clutch,
 a first pinion mounted on said main drive shaft,
 a driving wheel meshing with said first pinion and having one part of said clutch mounted at one end,
 a second pinion mounted on said driving shaft,
 a transmission wheel meshing with said second pinion,
 a rotatable transmission driving shaft mounting said transmission wheel and comprising a coupling having axially movable parts, the other part of said clutch being mounted at one end of said transmission driving shaft,
 a cam rotatable with said programmer drum, and
 a locking lever being for locking and unlocking said clutch parts, said lever carrying a cam follower at one end thereof and in engagement with said cam and a tenor at the other end thereof, said tenor being for engaging said coupling and axially moving said clutch parts relatively apart and thereby uncoupling said clutch;
 whereby depending upon the profile of said cam, said tenor during a cycle of said programming drum is initially disengaged from said coupling throughout the formation of the teeth in the workpiece resulting in the engagement of said clutch and the rotation of said spindle and then during the removal of a completed workpiece and the placing of a new workpiece in said spindle said tenor is engaged with said coupling, resulting in the disengagement of said clutch and the stopping of said driving shaft, the rotation of said spindle, and the reciprocation of said chisel holding means.

6. A machine as claimed in claim 2 and further including a clutch system coupling said driving shaft to said main drive shaft and comprising
 a clutch;
 a first pinion mounted on said main drive shaft;
 a driving wheel meshing with said first pinion and having one part of said clutch mounted at one end;
 a second pinion mounted on said driving shaft;
 a transmission wheel meshing with said second pinion;
 a rotatable transmission driving shaft mounting said transmission wheel and comprising a coupling having axially movable parts, the other part of said clutch being mounted at one end of said transmission driving shaft;
 a cam rotatable with said programmer drum; and
 a locking lever being for locking and unlocking said clutch parts, said lever carrying a cam follower at one end thereof and in engagement with said cam and a tenor at the other end thereof, said tenor being for engaging said coupling and axially moving said clutch parts relatively apart and thereby uncoupling said clutch;
 whereby depending upon the profile of said cam, said tenor during a cycle of said programming drum is initially disengaged from said coupling throughout the formation of the teeth in the workpiece resulting in the engagement of said clutch and the rotation of said spindle, and then during the removal of a completed workpiece and the placing of a new workpiece in said spindle said tenor is engaged with said coupling, resulting in the disengagement of said clutch and the stopping of said driving shaft, the rotation of said spindle, and the reciprocating of said chisel holding means.

7. A machine as claimed in claim 3 and further including a clutch system coupling said driving shaft to said main drive shaft and comprising
- a clutch;
- a first pinion mounted on said main drive shaft;
- a driving wheel meshing with said first pinion and having one part of said clutch mounted at one end;
- a second pinion mounted on said driving shaft;
- a transmission wheel meshing with said second pinion;
- a rotatable transmission driving shaft mounting said transmission wheel and comprising a coupling having axially movable parts, the other parts of said clutch being mounted at one end of said transmission driving shaft;
- a cam rotatable with said programmer drum; and
- a locking lever being for locking and unlocking said clutch parts, said lever carrying a cam follower at one end thereof and in engagement with said cam and a tenor at the other end thereof, said tenor being for engaging said coupling and axially moving said clutch parts relatively apart and thereby uncoupling said clutch;
- whereby depending upon the profile of said cam, said tenor during a cycle of said programming drum is initially disengaged from said coupling throughout the formation of the teeth in the workpiece resulting in the engagement of said clutch and the rotation of said spindle, and then during the removal of a completed workpiece and the placing of a new workpiece in said spindle said tenor is engaged with said coupling, resulting in the disengagement of said clutch and the stopping of said driving shaft, the rotation of said spindle, and the reciprocating of said chisel holding means.

8. A machine as claimed in claim 1 wherein said reciprocating moving means includes an oscillating lever reciprocatingly driven, ultimately, by said main drive shaft, and wherein said chisel holding means comprises a chisel-holder head mounted on the upper part of said oscillating lever and is comprised of
- a clevis rigidly mounted on the upper part of said oscillating lever and including a mounting pin,
- a chisel holder being for fixedly mounting the chisel and pivotably mounted on said mounting pin so as to have an angular rocking of small amplitude;
- a high-stiffness spring mounted on said clevis and engaging one end of said chisel holder for the resilient mounting thereof;
- the chisel being mountable such that the workpiece is engaged thereby in a dissymmetrical manner at an angle smaller than 90° and, as a result of the unequal distribution of the material of the workpiece on either side of the chisel tip, the chisel is loaded with a slight deviation during the penetration thereof into the workpiece for the formation of the hollow of the tooth and can, by the resultant compression of said spring, take said loading without the stressing thereof.

9. A machine as claimed in claim 4 wherein said chisel holder head is comprised of
- a clevis rigidly mounted on the upper part of said oscillating lever, and including a mounting pin;
- a chisel holder being for fixedly mounting the chisel and pivotably mounted on said mounting pin so as to have an angular rocking of small amplitude;
- a high-stiffness spring mounted on said clevis and engaging one end of said chisel holder for the resilient mounting thereof;
- the chisel being mountable such that the workpiece is engaged thereby in a dissymmetrical manner at an angle smaller than ninety degrees and, as result of the unequal distribution of the material of the workpiece on either side of the chisel tip, the chisel is loaded with a slight deviation during the penetration thereof into the workpiece for the formation of the hollow of the tooth and can, by the resultant compression of said spring, take said loading without the stressing thereof.

* * * * *